US012607455B1

(12) United States Patent
Segal et al.

(10) Patent No.: US 12,607,455 B1
(45) Date of Patent: Apr. 21, 2026

(54) GAP AND FLUSH MEASUREMENT

(71) Applicant: UVeye Ltd., Tel Aviv (IL)

(72) Inventors: Dan Segal, RaAnana (IL); Amir Hever, Tenafly, NJ (US); Ohad Hever, Maccabim-Reut (IL)

(73) Assignee: UVeye Ltd., Tel Aviv (IL)

( * ) Notice: Subject to any disclaimer, the term of this patent is extended or adjusted under 35 U.S.C. 154(b) by 0 days.

(21) Appl. No.: 19/342,577

(22) Filed: Sep. 28, 2025

(51) Int. Cl.
*G01B 11/14* (2006.01)
*G01B 11/04* (2006.01)
*G06T 7/00* (2017.01)

(52) U.S. Cl.
CPC ............ *G01B 11/14* (2013.01); *G01B 11/046* (2013.01); *G06T 7/0006* (2013.01); *G06T 2207/10024* (2013.01); *G06T 2207/10028* (2013.01); *G06T 2207/30252* (2013.01)

(58) Field of Classification Search
CPC ..... G01B 11/14; G01B 11/046; G06T 7/0006; G06T 2207/10024; G06T 2207/10028; G06T 2207/30252
USPC .................. 348/135; 382/141; 356/613, 625; 73/636
See application file for complete search history.

(56) References Cited

U.S. PATENT DOCUMENTS

| | | | | |
|---|---|---|---|---|
| 5,999,265 A | * | 12/1999 | Dalancon ............... | G01B 11/14 356/613 |
| 11,932,336 B1 | * | 3/2024 | Shingu ................. | B62D 65/026 |
| 2004/0120568 A1 | * | 6/2004 | Kidd ....................... | G06T 7/001 382/141 |
| 2013/0047730 A1 | * | 2/2013 | Wigh ................... | G01N 29/265 73/636 |
| 2014/0294243 A1 | * | 10/2014 | Park ....................... | G01B 11/06 356/625 |
| 2019/0193535 A1 | * | 6/2019 | Chiba ...................... | B60J 5/101 |

* cited by examiner

*Primary Examiner* — Jayanti K Patel
*Assistant Examiner* — Richard B Carter

(57) ABSTRACT

A system for inline measurement of gap width and flush depth of adjacent surfaces of a vehicle continuously moving longitudinally relative to the system comprises at least one laser source, at least one image sensor, and a processor configured to perform measurements within a predetermined cycle time. The processor controls the laser profiler to project laser beams onto vehicle surfaces, acquires optical images of reflected beams from the image sensor, and matches gap profiles from stored one-dimensional profiles to identify gaps. The system performs gap width and flush depth measurements and outputs anomaly detection signals when measurements deviate from predetermined target values. The system includes bias correction capabilities using empirically determined values and CAD-based target values for specific vehicle models. Dynamic adjustments are made based on vehicle color, with laser brightness optimized for surface reflectivity.

16 Claims, 8 Drawing Sheets

GAP AND FLUSH MEASUREMENT

FIELD AND BACKGROUND OF THE INVENTION

The present invention, optionally, relates to a vehicle quality inspection system and, more particularly, but not exclusively, to a system for inline measurement of gap width and flush depth of adjacent vehicle surfaces using laser profiling technology.

Traditional approaches to gap and flush measurement encompass several methodologies. Manual inspection techniques using physical gauges and visual assessment remain common but are inherently subjective, time-consuming, and prone to human error, particularly in high-volume production environments. Automated approaches include laser profiling systems operated either manually or with robotic arms, active stereo vision systems that use structured illumination patterns, and image-based approaches that rely on computer vision techniques to analyze surface discontinuities and edge detection from standard camera imagery.

Many existing automated systems require the vehicle to remain stationary during measurement. Contact-based measurement devices, while more consistent than manual methods, create bottlenecks in production lines and require dedicated measurement stations that interrupt continuous vehicle flow. Similarly, robotic arm-based laser profiling systems, though capable of high precision, typically operate in stop-and-measure cycles that impact manufacturing throughput.

Non-contact measurement approaches using structured light techniques, including laser profiling systems, provide high-precision dimensional measurements without physical contact. However, conventional structured light measurement systems encounter significant technical challenges when applied to moving vehicles, including vibration effects, positioning uncertainties, and the need for precise timing coordination to maintain measurement accuracy during continuous motion.

Vehicle surface characteristics, particularly color variations, present additional complications for optical measurement systems. Different surface colors exhibit varying reflectivity properties, which can significantly impact measurement reliability and system performance across different vehicle models and paint schemes. Active stereo and image-based approaches are similarly affected by surface reflectivity and ambient lighting conditions.

The integration of measurement systems into existing production environments must consider operational constraints. Automotive production lines operate under strict timing requirements, necessitating measurement systems capable of performing within predetermined cycle times without compromising overall manufacturing throughput.

For purposes of better understanding some embodiments of the present invention, as illustrated in FIGS. 3-8 of the drawings, reference is first made to an illustration of flush, gap, symmetry and parallelism definitions as illustrated in FIG. 1. According to the background of the invention, accurate measurement of these dimensional parameters is essential for automotive quality control but has been challenging to achieve during continuous vehicle movement in production environments.

As used herein, the term "gap" 101 means the space or opening between two adjacent vehicle 100 surfaces 102a, 102b, such as between a door and door frame, hood and fender, or other adjoining body panels, where the surfaces are intentionally separated to allow for proper fit, function, and thermal expansion.

As used herein, the term "gap width" 110 means the distance between adjacent vehicle surfaces measured perpendicular to the surfaces at their closest approach.

As used herein, the term "flush depth" 120 means the vertical offset or step height difference between adjacent vehicle surfaces that should ideally be coplanar.

As used herein, the term "symmetry" means the side-to-side variation between measurements of geometrically corresponding gaps 101a, 101b at mirrored positions on opposite sides of the vehicle centerline.

As used herein, the term "parallelism" means the variation in gap width along a continuous margin on the same side of the vehicle 101c-101f, calculated as the difference between the largest gap measurement and the smallest gap measurement along that margin.

As used herein, the term "inline measurement" means measurement operations performed while the vehicle maintains continuous movement through the measurement system without stopping or significant deceleration.

Reference is now made to FIG. 2, illustrating laser profiler based measurements. According to the background of the invention, a laser profiler 200 comprises a laser source 210 and an image sensor 220. The laser source 210 emits a laser beam 230, which is reflected off a surface 120, thereby enabling the image sensor 220 to detect image of the scattered reflection. The laser profiler 200 measures the surfaces 102 in multiple positions (for example, due to the surfaces 102 being moved beneath it), thereby generating a plurality of measured points 240 describing geometry of the surfaces 102 and of the gap 101 between them.

Optionally, the laser profiler 200 comprises one or more cylindrical lens systems to manipulate geometry of the laser beam emitted by the laser source 210, and one or more spherical lens systems to enhance detection of the reflected laser beam by the image sensor 220.

There remains a need in the art for improved systems and methods for measuring gap width and flush depth that can operate effectively during continuous vehicle movement while maintaining high accuracy and reliability across varying vehicle surface characteristics.

SUMMARY OF THE INVENTION

The present invention provides a system for inline measurement of gap width and flush depth of adjacent surfaces of a vehicle that enables continuous vehicle movement during measurement operations. The system employs laser profiling technology in combination with image sensing to perform real-time dimensional measurements without requiring the vehicle to be stationary.

According to an aspect of some embodiments of the present invention there is provided a system for inline measurement of gap width and flush depth of adjacent surfaces of a vehicle, comprising: at least one laser profiler, each laser profiler comprising at least one laser source and at least one image sensor; a non-transitory computer readable memory, the memory configured to store a plurality of CAD-based predetermined target values for specific vehicle models; and a processor configured to perform within a predetermined cycle time the following: control the at least one laser source to project one or more laser beams onto the adjacent surfaces; acquire, from the at least one image sensor, one or more optical images of the one or more laser beams reflected off the adjacent surfaces; estimate a speed and a longitudinal position of the vehicle relative to the at least one laser profiler; match a gap profile from a plurality of stored one-dimensional gap profiles to the one or more optical images, the estimated speed and the estimated longitudinal position, thereby identifying a gap; retrieve, from the plurality of predetermined target values corresponding to the identified gap of a current vehicle model, a predetermined target value; perform at least one of (a) a gap width measurement and (b) a flush depth measurement for at least one of the one or more optical images; and output an anomaly detection signal if at least one of (a) the gap width measurement and (b) the flush depth measurement deviates from the predetermined target value, wherein the vehicle continuously moves in a longitudinal direction relative to the system.

Optionally, the system further comprises a non-transitory computer readable memory, the memory configured to store a bias correction table, wherein the processor is further configured to: retrieve a bias correction value from the bias correction table corresponding to the identified gap; and apply the bias correction value to adjust at least one of (a) the gap width measurement and (b) the flush depth measurement.

Optionally, the values for each identified gap in the bias correction table are empirically determined by comparing measurements by the at least one laser profiler to caliper measurements.

Optionally, the processor is further configured to: receive, from the at least one image sensor, information on the vehicle color; and dynamically adjust at least one of (a) exposure setting of the at least one image sensor, and (b) brightness of the at least one laser source based on the information on the vehicle color.

Optionally, the processor is further configured to increase laser source brightness for dark colored vehicles and to decrease laser source brightness for light colored vehicles.

Optionally, the predetermined cycle time is 30 seconds or less.

Optionally, the continuous vehicle movement is facilitated by the vehicle's own power.

Optionally, the continuous vehicle movement is facilitated by a conveyor belt carrying the vehicle.

Optionally, the conveyor belt operates at a speed between 6-15 meters per minute, and the predetermined cycle time is optimized to maintain the conveyor belt speed of operation.

Optionally, the system further comprises a drive-through gate structure, wherein the at least one image sensor and the at least one laser source are mounted on the gate structure.

Optionally, the gate structure comprises a roof component, a left wall component, and a right wall component, and the left wall component and the right wall component are positioned on opposite sides of the conveyor belt.

Optionally, the system further comprises an auxiliary pedestal configured to elevate the gate structure above the conveyor belt to accommodate varying conveyor widths.

Optionally, the at least one laser profiler comprises a plurality of laser profilers positioned at predetermined working distances from the respective adjacent surfaces to enable simultaneous measurement of multiple vehicle areas during continuous movement.

Optionally, the plurality of laser profilers comprises one or more of: a plurality of side-facing laser profilers with a working distance of approximately 1 meter; a plurality of roof-facing laser profilers with a working distance of approximately 1 meter; a plurality of back-facing laser profilers with a working distance of approximately 1 meter; a plurality of front-facing laser profilers with a working distance of approximately 1 meter; and a plurality of hood-facing laser profilers with a working distance of approximately 1.2 meters.

Optionally, the gap width and flush depth measurements are performed with approximately 0.1 millimeter accuracy.

According to an aspect of some embodiments of the present invention there is provided a processor-implemented method for inline measurement of gap width and flush depth of adjacent surfaces of a vehicle, comprising: controlling at least one laser source to project one or more laser beams onto the adjacent surfaces; acquiring, from at least one image sensor, one or more optical images of the one or more laser beams reflected off the adjacent surfaces; estimating a speed and a longitudinal position of the vehicle relative to the at least one laser profiler; matching a gap profile from a plurality of stored one-dimensional gap profiles to the one or more optical images, the estimated speed and the estimated longitudinal position, thereby identifying a gap; retrieving, from a non-transitory computer readable memory configured to store a plurality of CAD-based predetermined target values for specific vehicle models, a predetermined target value corresponding to the identified gap of a current vehicle model; performing at least one of (a) a gap width measurement and (b) a flush depth measurement for at least one of the one or more optical images; and outputting an anomaly detection signal if at least one of (a) the gap width measurement and (b) the flush depth measurement deviates from a predetermined target value, wherein the vehicle continuously moves in a longitudinal direction relative to the system.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
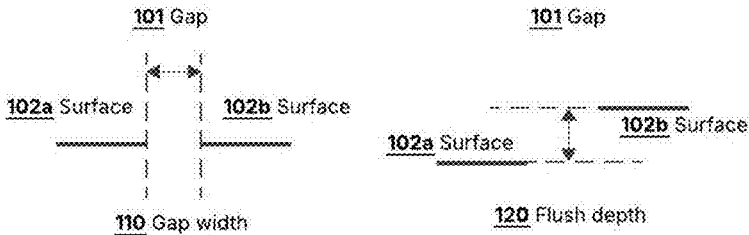
FIG. 1 is an illustration of flush, gap, symmetry and parallelism definitions, according to the background of the invention.
Figure 1:
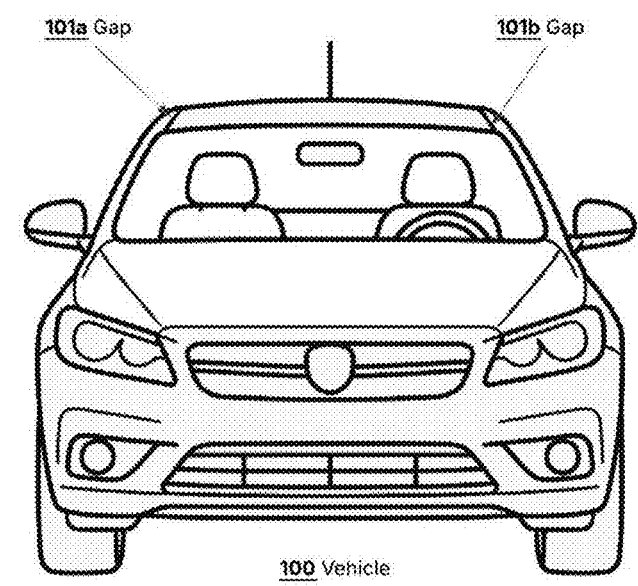
Figure 1:
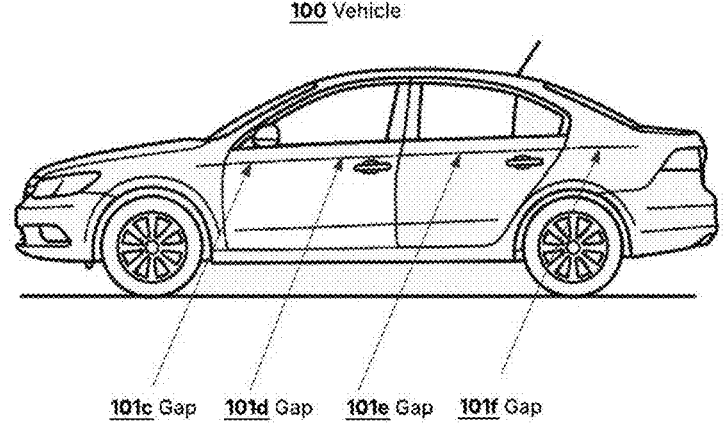
Figure 2:
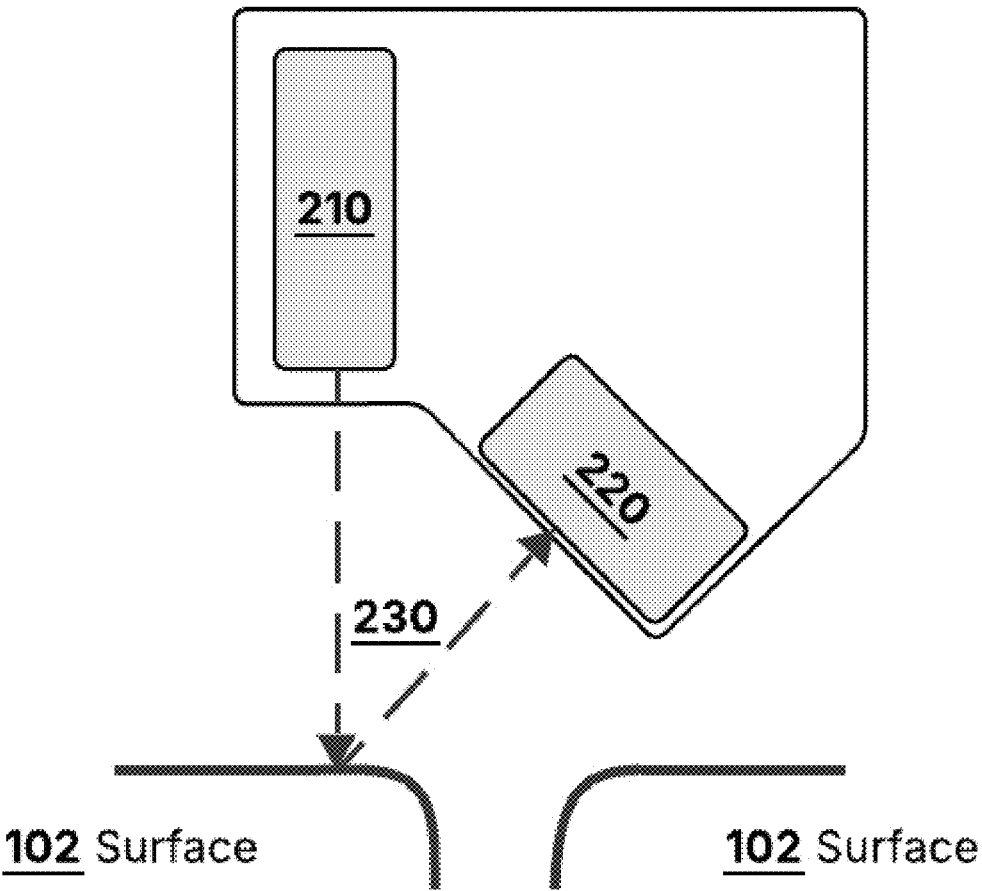
FIG. 2 is an illustration of laser profiler based measurements, according to the background of the invention.
Figure 2:
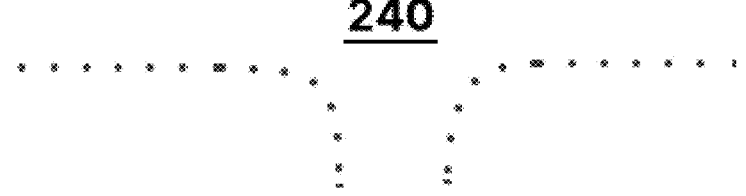

According to one of the methods disclosed in the present application, gap width and flush depth measurements are performed on a vehicle moving continuously through a production line without requiring the vehicle to stop or decelerate significantly during the measurement process.

The present invention, optionally, relates to a vehicle quality inspection system and, more particularly, but not exclusively, to a system for inline measurement of gap width and flush depth of adjacent vehicle surfaces using laser profiling technology.

The method described hereinbelow enables real-time dimensional measurement and quality assessment with accuracy of less than 0.1 mm while maintaining production line throughput requirements.

The method described hereinbelow is particularly useful for automotive manufacturing environments where continuous production flow is critical, as it eliminates the bottlenecks associated with stationary measurement systems while providing superior accuracy and consistency compared to manual inspection methods.

The present invention offers several notable advantages and improvements over existing gap and flush measurement approaches. The system operates effectively across varying vehicle surface characteristics and color variations that typically challenge optical measurement systems. The inline measurement capability maintains manufacturing cycle times while providing comprehensive quality data including gap width, flush depth, symmetry, and parallelism measurements. Additionally, the automated profile matching and anomaly detection capabilities reduce dependency on operator skill and judgment, thereby improving measurement consistency and reliability in high-volume production environments.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 3:
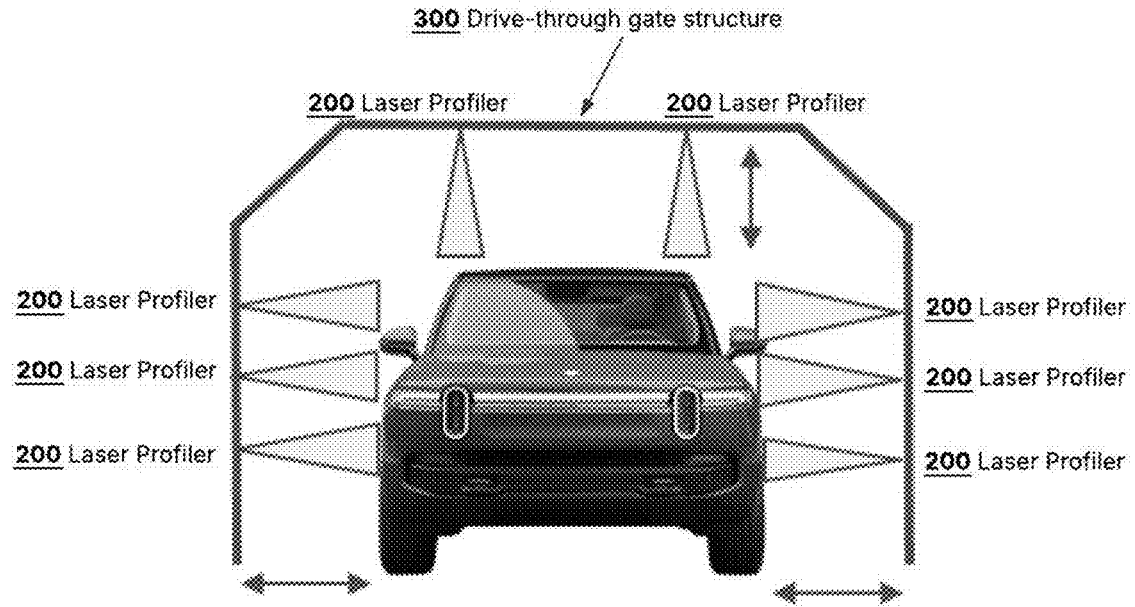
FIG. 3 is an illustration of laser profiler and image sensor placement relative to a vehicle, according to some embodiments of the invention.

Referring now to the drawings, FIG. 3 illustrates laser profiler and image sensor placement relative to a vehicle. According to some embodiments of the invention, a plurality of laser profilers 200, each laser profiler 200 comprising at least one laser source 210 and at least one image sensor 220, are positioned on a vehicle 100 manufacturing assembly line such that the plurality of laser profilers 200 can measure one or more gaps 101 in surface structure of the vehicle 100 model manufactured at the assembly line.

Optionally, the plurality of laser profilers 200 is mounted on a drive-through gate structure 300, wherein a vehicle 100 on the assembly line moves through the gate, providing simultaneous or consecutive access to the one or more gaps 101 in the surface structure of the vehicle 100 for measurements by the plurality of laser profilers 200.

Optionally, the gate structure 300 comprises a roof component, enabling mounting of one or more laser profilers 200 to access gaps 101 on vehicle 100 roof and hood.

Optionally, the gate structure 300 comprises a left wall component and a right wall component, enabling mounting of one or more laser profilers 200 to access gaps 101 on vehicle 100 front, back, and sides. For example, some of the laser profilers 200 may be angled towards the direction of an approaching vehicle 100 to perform measurements of gaps 101 on the vehicle 100 front, some of the laser profilers 200 may be angled towards the direction of a receding vehicle 100 to perform measurements of gaps 101 on the vehicle 100 back, and some of the laser profilers 200 may be angled normally to the direction of vehicle 100 movement to perform parallelism variation and symmetry measurements of gaps 101 on the vehicle 100 sides.

Optionally, the working distance of each laser profiler in the plurality of laser profilers 200 is configured to match the expected distance from the laser profiler to the respective surfaces 102 of the vehicle 100. In an example, the working distance of a laser profiler 200 may be configured to comprise 1.0-1.2 m.

Optionally, the working distance of a laser profiler 200 may be configured to support performing gap width 110 and flush depth 120 measurements with a predetermined accuracy. For example, the predetermined accuracy may comprise 0.1 mm or less.

Optionally, the vehicle 100 moves through the gate structure 300 under its own power. In an example, the vehicle 100 may be operated by an in situ driver or by a remote operator. In another example, the vehicle 100 moves through the gate structure 300 on an inclined floor surface under the influence of gravity.

Optionally, the gate structure 300 is placed on a conveyor belt comprising the assembly line, wherein the conveyor belt facilitates movement of the vehicle 100 through the gate structure 300. For example, the wall component of the gate structure 300 is located directly above the conveyor belt, and the left wall component and the right wall component of the gate structure 300 are positioned on opposite sides of the conveyor belt. For example, the conveyor belt may operate at a speed of 6-15 meters per minute.

Figure 4:
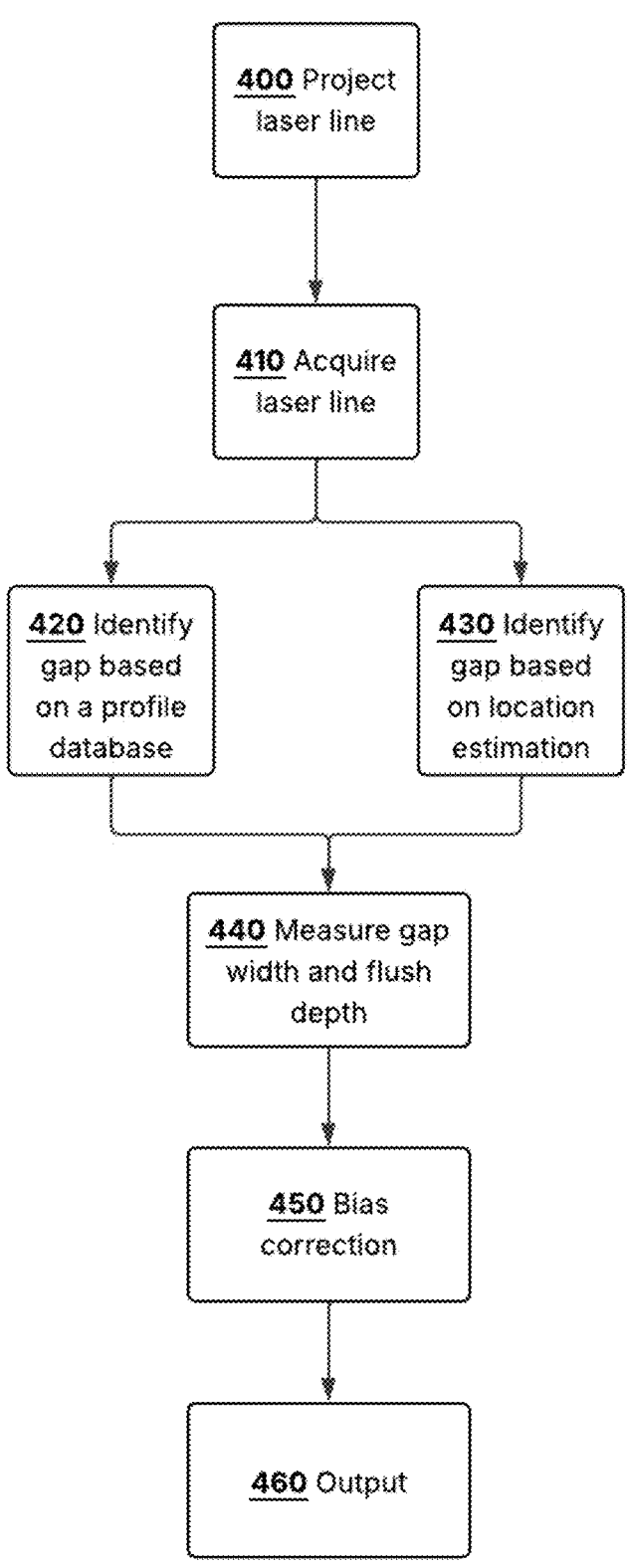
FIG. 4 is a flowchart of gap width and flush depth measurement method, according to some embodiments of the invention.

Reference is now made to FIG. 4, illustrating a flowchart of gap width and flush depth measurement method. According to some embodiments of the invention, the process of the method proceeds to the following steps.

At step 400, the system controls one or more laser profilers 200 to project one or more laser beams 230, via the respective laser sources 210, onto adjacent surfaces 102 of a vehicle 100, thereby generating a plurality of measured points 240.

Optionally, the system may control the one or more laser profilers 200 to project the one or more laser beams 230 at a configured periodicity. Next, the process proceeds to a step 410.

At the step 410, the system acquires, from the one or more laser profilers via the respective image sensors 220, one or more optical images of the projected laser beams 230 reflected off the adjacent surfaces 102.

Optionally, the system is configured to perform gap 101 identification based on a gap profile database. Next, the process proceeds to a step 420.

Optionally, the system is configured to perform gap 101 identification based on relative location estimation. Next, the process proceeds to a step 430.

Optionally, the system is configured to perform gap 101 identification based on a gap profile database and based on relative location estimation in a complementary manner. The process may proceed to each of the steps 420, 430 sequentially or in parallel.

At the step 420, the process matches a plurality of measured points 240 generated by a laser profiler 200 against a database of one-dimensional gap 101 profiles stored in a non-transitory computer memory, thereby identifying a measured gap 101. For example, the system may employ profile matching algorithms to identify specific vehicle gaps by comparing the plurality of measured points 240 against a database of reference profiles corresponding to known vehicle structural components and gap locations. Each reference profile in the database may contain characteristic geometric signatures associated with specific gap types, such as door-to-frame gaps, hood-to-fender gaps, or panel-to-panel interfaces, wherein the geometric signatures may include distinctive surface transitions, edge characteristics, and dimensional relationships unique to each gap location.

Optionally, the plurality of measured points 240 is processed through pattern recognition algorithms that analyze surface curvature, step heights, and spatial relationships to determine correlation coefficients with stored reference profiles. The pattern recognition algorithms may include cross-correlation techniques that compute similarity measures between the plurality of measured points 240 and reference profiles, dynamic time warping algorithms that accommodate variations in measurement timing and positioning, and feature extraction algorithms that identify characteristic geometric landmarks such as edge transitions, surface discontinuities, and curvature inflection points.

Optionally, the system may further comprise at least one of (a) a template matching algorithm using normalized correlation coefficients, (b) a least squares fitting algorithm for geometric feature alignment, and (c) a machine learning classification algorithm trained on historical measurement data to improve gap identification accuracy over time.

At the step 430, the process performs vehicle position tracking and gap location determination based on the detected occlusion timing of a laser profiler 200 by the front of the vehicle 100 and a known movement speed of the vehicle 100 relative to the laser profiler 200, wherein the system calculates the current vehicle 100 position relative to a laser profiler 200 in the plurality of laser profilers 200 and to determine which specific gap 101 should be currently visible within the measurement field of view of the laser profiler 200, thereby identifying a measured gap 101.

Next, the process proceeds to a step 440. At the step 440, the system estimates gap width 110 and flush depth 120 of the measured gap 101 based on the plurality of measured points 240.

Optionally, the gap width 110 estimation involves identifying the boundary points of adjacent vehicle surfaces 102 within the plurality of measured points 240 and calculating the perpendicular distance between these surfaces 102 at their closest approach using geometric algorithms such as minimum distance calculation between line segments or point-to-line distance computation.

Optionally, the system employs edge detection algorithms including gradient-based methods, Canny edge detection, or derivative analysis to precisely locate surface boundaries within the point cloud data.

Optionally, the flush depth 120 estimation involves determining the vertical offset between adjacent surfaces 102 that should ideally be coplanar by fitting reference planes to each surface using least squares plane fitting algorithms or RANSAC (Random Sample Consensus) methods to minimize the influence of measurement noise. The flush depth 120 is then calculated as the perpendicular distance between the fitted planes or as the height difference between corresponding points on adjacent surfaces.

Optionally, the system utilizes polynomial curve fitting or spline interpolation algorithms to smooth the plurality of measured points 240 and improve measurement accuracy, particularly when dealing with curved vehicle surfaces 102 or when compensating for minor surface 102 irregularities that could affect the precision of gap width 110 and flush depth 120 calculations.

Next, the process proceeds to a step 450. At the step 450, the system performs measurement bias correction to compensate for systematic measurement errors that may arise from factors such as laser profiler 200 positioning, surface 102 reflectivity variations, or geometric distortions inherent to the optical measurement process.

Optionally, the system retrieves a bias correction value from a stored bias correction table, wherein the bias correction value corresponds to the specific identified gap 101 and is applied to adjust the gap width measurement 110, the flush depth measurement 120, or both measurements as appropriate. The bias correction values for each identified gap 101 in the correction table are empirically determined through calibration procedures that compare laser profiler measurements to reference measurements obtained using precision calipers or other traceable measurement standards, thereby establishing correction factors that account for systematic deviations between optical and mechanical measurement methods. This calibration process may be performed across multiple vehicle 100 samples and gap 101 locations to build a comprehensive correction database that improves measurement accuracy and traceability to established dimensional standards.

Optionally, the system accesses a stored database of CAD-based predetermined target values, wherein the database contains design specifications for gap width 110 and flush depth 120 corresponding to specific vehicle 100 models and gap 101 locations. The system subsequently retrieves the appropriate predetermined target value from this database based on the identified gap and current vehicle 100 model, enabling the system to perform accurate quality assessment by comparing the bias-corrected measurements against the intended design specifications for each specific gap 101 location.

Next, the process proceeds to a step 460. At the step 460, responsive to at least one of the gap width 110 measurement and the flush depth 120 measurement deviating from a respective predetermined target value the system outputs an anomaly detection signal. The anomaly detection process involves comparing the bias-corrected gap width 110 and flush depth 120 measurements against their respective predetermined target values retrieved from a CAD-based database, applying predefined tolerance limits to determine whether each measurement falls within acceptable quality parameters.

Optionally, the system further employs statistical analysis methods such as control limit checking, where measurements exceeding upper or lower control limits trigger anomaly signals, or trend analysis algorithms that detect systematic deviations indicating process drift or tooling wear. The anomaly detection signal may be configured as a binary pass/fail indicator, a graduated severity level based on the magnitude of deviation, or a composite quality score incorporating multiple measurement parameters including gap width 110, flush depth 120, symmetry, and parallelism assessments. Responsive to detection of an anomaly, the system can immediately alert quality control personnel, trigger automated marking or sorting mechanisms to segregate the non-conforming vehicle 100, or interface with manufacturing execution systems to initiate corrective actions.

Optionally, the vehicle 100 continuously moves in a longitudinal direction relative to the system throughout the entire measurement and evaluation process. The continuous movement capability ensures that the anomaly detection process does not interrupt production flow, allowing for real-time quality feedback while maintaining manufacturing throughput requirements essential for high-volume automotive production environments.

Optionally, the system operates within a predetermined cycle time of 30 seconds or less, enabling measurement and analysis of multiple gap 101 locations on each vehicle 110 while maintaining compatibility with standard automotive production line speeds. The predetermined cycle time is optimized to maintain the conveyor belt speed of operation, ensuring seamless integration with existing manufacturing infrastructure without requiring modifications to established production timing or workflow sequences. This timing optimization allows the measurement system to complete data acquisition, profile matching, gap identification, dimensional analysis, bias correction, and anomaly detection within the available time window as the vehicle 100 passes by the plurality of laser profilers 200, thereby providing comprehensive quality assessment without creating bottlenecks or disruptions to the continuous production process.

Optionally, the system incorporates adaptive measurement parameters to compensate for variations in vehicle 100 surface 102 characteristics that can affect laser profiler 200 accuracy. Optionally, the system may receive information on the vehicle color from one or more image sensors, wherein an image sensor may comprise a standalone camera device or respective image sensor 220 component of a laser profiler 200. Optionally, the system may interface with production line data systems, tracking vehicle 100 specifications including paint color and finish type.

Optionally, based on the vehicle 100 color information, the system dynamically adjusts the exposure setting of at least one image sensor 220 in at least one laser profiler 200, the brightness of at least one laser source 210 in least one laser profiler 200, or both parameters to optimize measurement conditions for each specific vehicle 100.

Optionally, the system is configured to increase laser source brightness for dark colored vehicles, which typically exhibit lower reflectivity and may absorb more incident laser energy, thereby requiring higher illumination levels to achieve adequate signal-to-noise ratios in the reflected laser light. Conversely, the system is configured to decrease laser source brightness for light colored vehicles, which demonstrate higher reflectivity and can cause signal saturation or blooming effects if excessive laser power is applied. This dynamic adjustment capability ensures consistent measurement accuracy across the full spectrum of vehicle 100 colors and surface finishes encountered in automotive production, eliminating the need for manual recalibration when transitioning between different colored vehicles 100 and maintaining measurement precision regardless of paint color variations within the production sequence.

Optionally, the system performs averaging of measurements across several frames to enhance measurement accuracy and reduce the impact of transient noise or vibrations that may affect individual measurement readings. As the vehicle 100 moves continuously through the measurement zone, a laser profiler 200 captures multiple sequential frames of profile data for a gap 101, wherein each frame contains a complete set of measured points representing the gap geometry at a specific instant in time. The system further applies statistical averaging algorithms, such as arithmetic mean calculation or weighted averaging based on signal quality metrics, to combine measurements from multiple frames into a single consolidated result for gap width and flush depth parameters. This multi-frame averaging approach helps to minimize the influence of random measurement errors, mechanical vibrations from the conveyor system, or temporary occlusions that might affect individual frame measurements. The system may be configured to capture and average measurements across a predetermined number of frames, such as 3 to 10 sequential measurements, or dynamically adjust the averaging window based on measurement consistency and vehicle 100 speed to optimize the balance between measurement accuracy and processing time within the available cycle time constraints.

Figure 5:
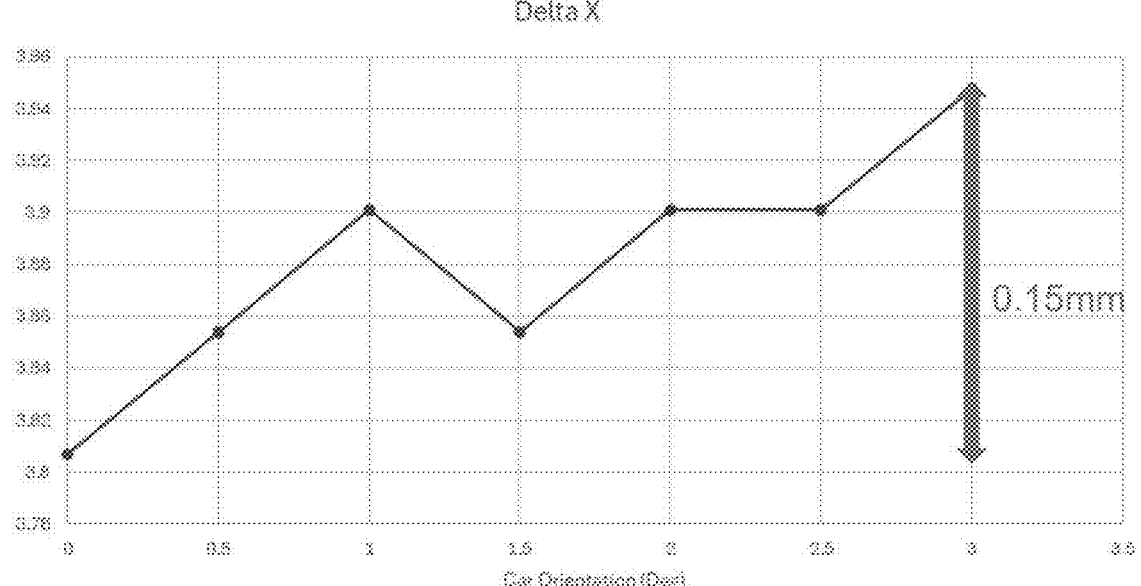
FIG. 5 is an illustration of measured gap width dependence on vehicle orientation, according to some embodiments of the invention.

Reference is now made to FIG. 5, illustrating measured gap width dependence on vehicle orientation. According to some embodiments of the invention, estimation of a gap 101 width depends on orientation of a vehicle 100 relative to a laser profiler 200. For example, a gap 101 of a vehicle 100 may be measured to possess a width of 3.8 mm in case the vehicle 100 is oriented in a perpendicular direction to the laser profiler 200, and the same gap 101 may be measured to possess a width of 3.95 mm in case the vehicle 100 is oriented at an angle of 3° to the perpendicular direction to the laser profiler 200. As a consequence, operation of the present invention requires at least one of (a) precise alignment of the vehicle 100 relative to the plurality of laser profilers 200, and (b) continuous monitoring of orientation angle of the vehicle 100 relative to the plurality of laser profilers 200, enabling subsequent bias computation and correction of measured gap width 110 and flush depth 120 values.

Figure 6:
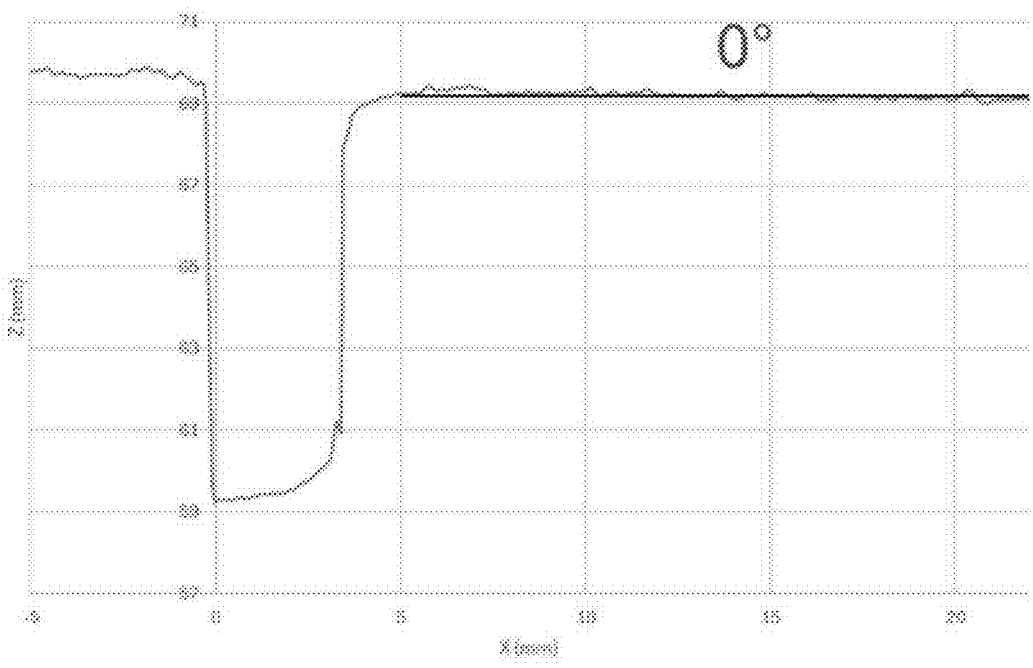
FIG. 6 is an illustration of measured gap profile dependence on vehicle orientation, according to some embodiments of the invention.
Figure 6:
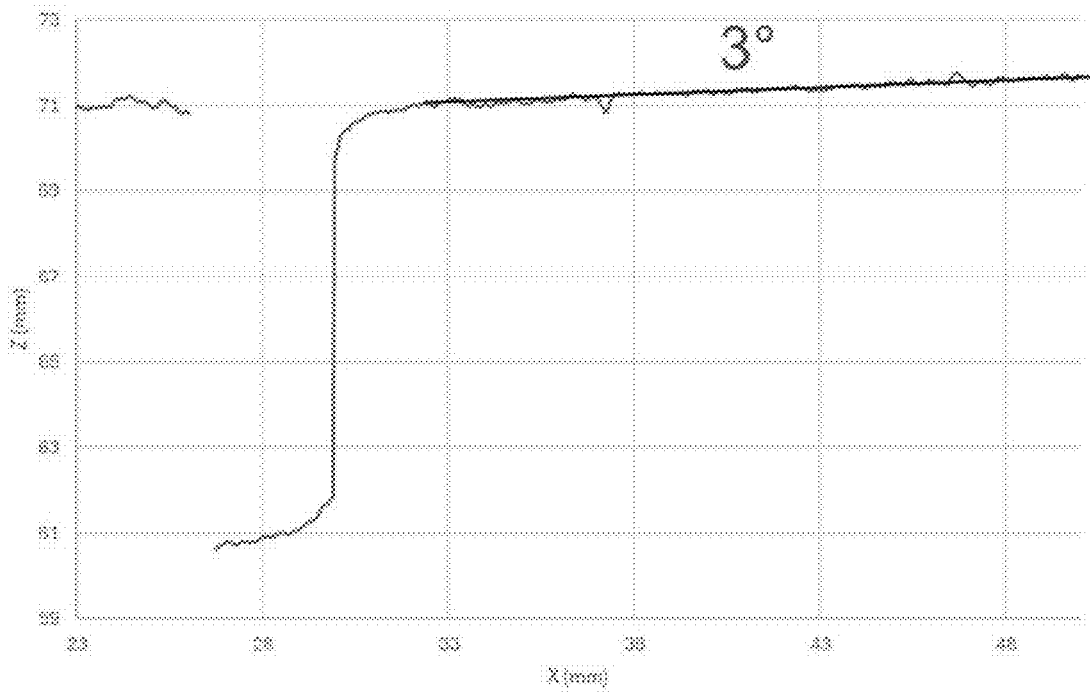

Reference is now made to FIG. 6, illustrating measured gap profile dependence on vehicle orientation. According to some embodiments of the invention, the pattern 610 of the plurality of measured points 240 in case the vehicle 100 is oriented in a perpendicular direction to the laser profiler 200 is distinct from the pattern 620 of the plurality of measured points 240 in case the vehicle 100 is oriented at an angle of 3° to the perpendicular direction to the laser profiler 200.

Optionally, a pattern of the plurality of points 240 measured over a continuous surface 102 enables the invention to estimate the orientation angle of the vehicle 100 to the perpendicular direction to the laser profiler 200 and perform a respective correction of measured gap width 110 and flush depth 120 values.

Figure 7:
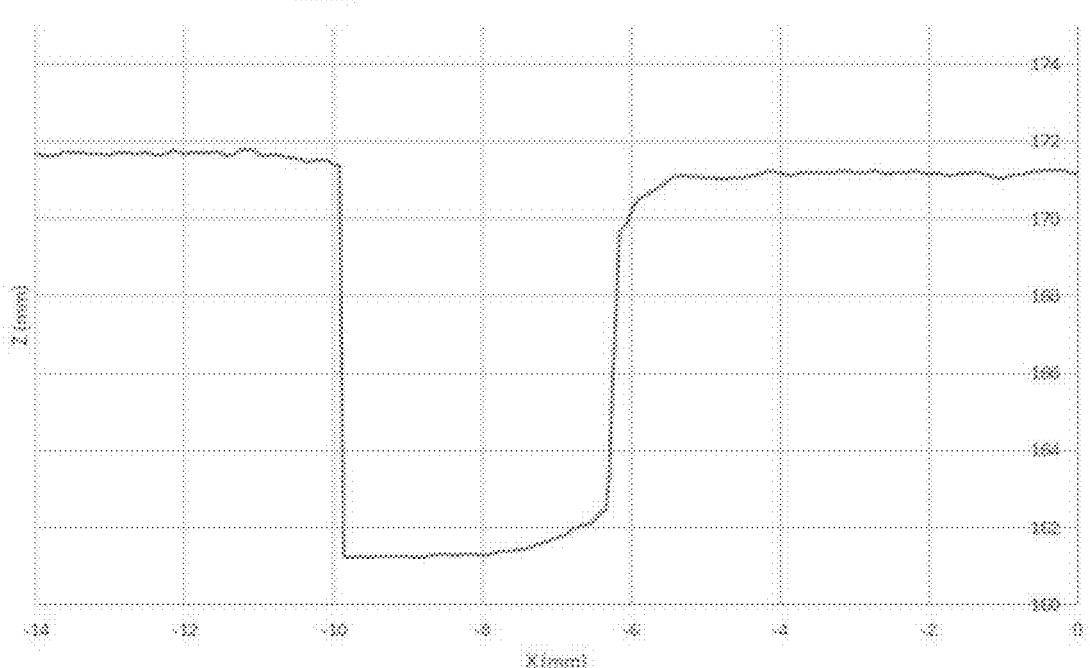
FIG. 7 is an illustration of measured gap profile dependence on vehicle distance, according to some embodiments of the invention.
Figure 7:
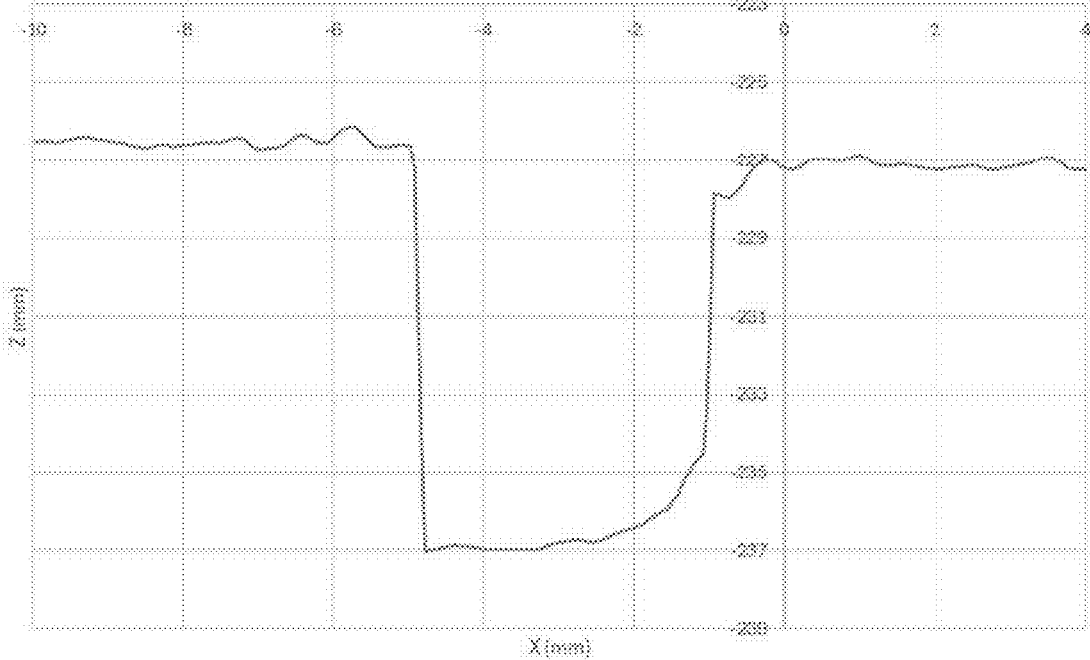

Reference is now made to FIG. 7, illustrating measured gap profile dependence on vehicle distance. According to some embodiments of the invention, the pattern 710 of the plurality of measured points 240 in case the vehicle 100 is located at a distance D=40 cm from the laser profiler 200 is distinct from the pattern 720 of the plurality of measured points 240 in case the vehicle 100 is located at a distance D=80 cm from the laser profiler 200. Inherent inaccuracy of measurements may exaggerate features of a surface 102 at greater distances.

Optionally, the system comprises a digital signal processing (DSP) unit configured to analyze the plurality of measured points 240, normalizing it with respect to a measured distance to the vehicle 100 and relative orientation to the vehicle 100.

Figure 8:
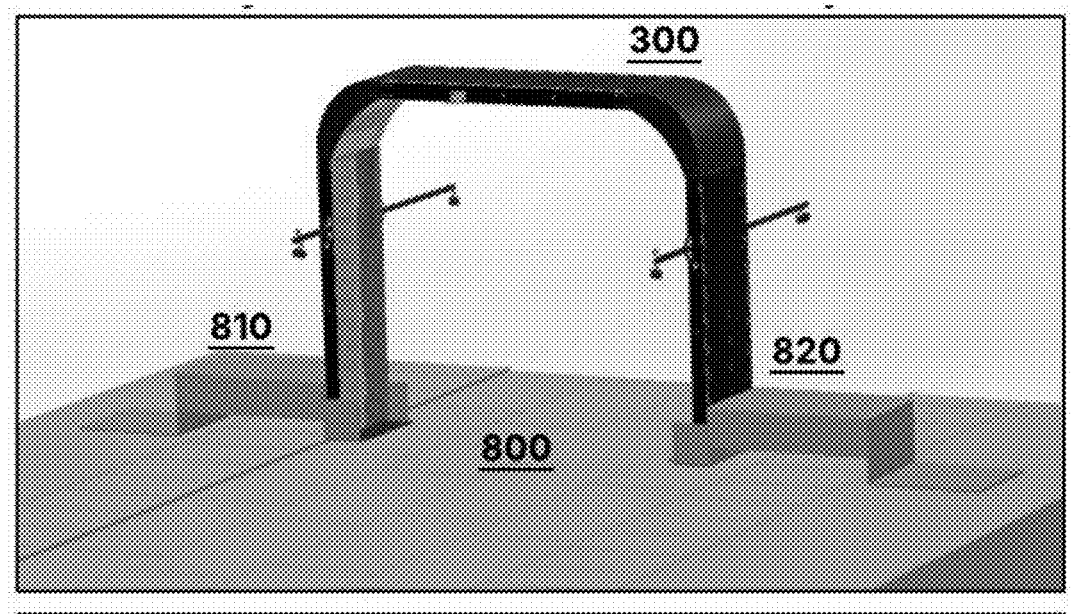
FIG. 8 is an illustration of drive-through gate elevated on an auxiliary pedestal, according to some embodiments of the invention.
Figure 8:
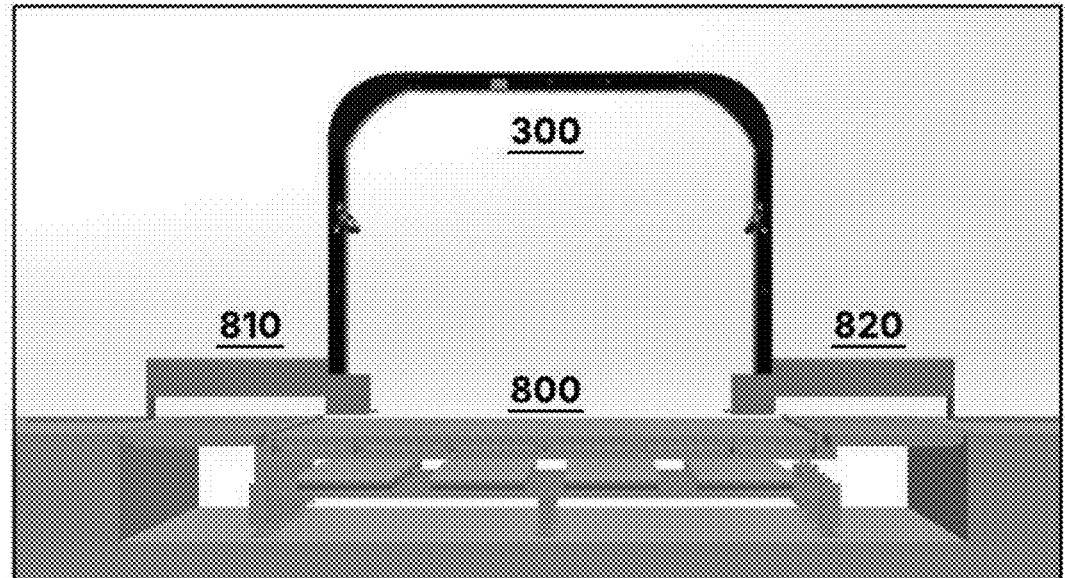

Reference is now made to FIG. 8, illustrating a drive-through gate elevated on an auxiliary pedestal above a conveyor belt. According to some embodiments of the invention, a pedestal is mounted at a conveyor belt 800, and comprises a left base 810 and a right base 820. The bases 810, 820 extend towards the longitudinal midline of the conveyor belt 800, and are configured to support the drive-through gate structure 300 above the conveyor belt 800, enabling the system to accommodate varying conveyor widths exceeding the width of the gate structure 300.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for inline measurement of gap width and flush depth of adjacent surfaces of a vehicle, comprising:

at least one laser profiler, each laser profiler comprising at least one laser source and at least one image sensor;

a non-transitory computer readable memory, the memory configured to store a plurality of CAD-based predetermined target values for specific vehicle models; and a processor configured to perform within a predetermined cycle time the following:

control the at least one laser source to project one or more laser beams onto the adjacent surfaces;

acquire, from the at least one image sensor, one or more optical images of the one or more laser beams reflected off the adjacent surfaces;

estimate a speed and a longitudinal position of the vehicle relative to the at least one laser profiler;

match a gap profile from a plurality of stored one-dimensional gap profiles to the one or more optical images, the estimated speed and the estimated longitudinal position, thereby identifying a gap;

retrieve, from the plurality of predetermined target values corresponding to the identified gap of a current vehicle model, a predetermined target value;

perform at least one of (a) a gap width measurement and (b) a flush depth measurement for at least one of the one or more optical images; and output an anomaly detection signal if at least one of (a) the gap width measurement and (b) the flush depth measurement deviates from the predetermined target value, wherein the vehicle continuously moves in a longitudinal direction relative to the system.

2. The system according to claim 1, further comprising a non-transitory computer readable memory, the memory configured to store a bias correction table, wherein the processor is further configured to:

retrieve a bias correction value from the bias correction table corresponding to the identified gap; and apply the bias correction value to adjust at least one of (a) the gap width measurement and (b) the flush depth measurement.

3. The system according to claim 2, wherein the values for each identified gap in the bias correction table are empirically determined by comparing measurements by the at least one laser profiler to caliper measurements.

4. The system according to claim 1, wherein the processor is further configured to:

receive, from the at least one image sensor, information on the vehicle color; and dynamically adjust at least one of (a) exposure setting of the at least one image sensor, and (b) brightness of the at least one laser source based on the information on the vehicle color.

5. The system according to claim 4, wherein the processor is further configured to increase laser source brightness for dark colored vehicles and to decrease laser source brightness for light colored vehicles.

6. The system according to claim 1, wherein the predetermined cycle time is 30 seconds or less.

7. The system according to claim 1, wherein the continuous vehicle movement is facilitated by the vehicle's own power.

8. The system according to claim 1, wherein the continuous vehicle movement is facilitated by a conveyor belt carrying the vehicle.

9. The system according to claim 8, wherein the conveyor belt operates at a speed between 6-15 meters per minute, and the predetermined cycle time is optimized to maintain the conveyor belt speed of operation.

10. The system according to claim 8, further comprising a drive-through gate structure, wherein the at least one image sensor and the at least one laser source are mounted on the gate structure.

11. The system according to claim 10, wherein the gate structure comprises a roof component, a left wall component, and a right wall component, and wherein the left wall component and the right wall component are positioned on opposite sides of the conveyor belt.

12. The system according to claim 10, further comprising an auxiliary pedestal configured to elevate the gate structure above the conveyor belt to accommodate varying conveyor widths.

13. The system of claim 1, wherein the at least one laser profiler comprises a plurality of laser profilers positioned at predetermined working distances from the respective adjacent surfaces to enable simultaneous measurement of multiple vehicle areas during continuous movement.

14. The system of claim 13, wherein the plurality of laser profilers comprises one or more of:

a plurality of side-facing laser profilers with a working distance of approximately 1 meter;

a plurality of roof-facing laser profilers with a working distance of approximately 1 meter;

a plurality of back-facing laser profilers with a working distance of approximately 1 meter;

a plurality of front-facing laser profilers with a working distance of approximately 1 meter; and a plurality of hood-facing laser profilers with a working distance of approximately 1.2 meters.

15. The system of claim 1, wherein the gap width and flush depth measurements are performed with approximately 0.1 millimeter accuracy.

16. A processor-implemented method for inline measurement of gap width and flush depth of adjacent surfaces of a vehicle, comprising:

controlling at least one laser source to project one or more laser beams onto the adjacent surfaces;

acquiring, from at least one image sensor, one or more optical images of the one or more laser beams reflected off the adjacent surfaces;

estimating a speed and a longitudinal position of the vehicle relative to the at least one laser profiler;

matching a gap profile from a plurality of stored one-dimensional gap profiles to the one or more optical images, the estimated speed and the estimated longitudinal position, thereby identifying a gap;

retrieving, from a non-transitory computer readable memory configured to store a plurality of CAD-based predetermined target values for specific vehicle models, a predetermined target value corresponding to the identified gap of a current vehicle model;

performing at least one of (a) a gap width measurement and (b) a flush depth measurement for at least one of the one or more optical images; and outputting an anomaly detection signal if at least one of (a) the gap width measurement and (b) the flush depth measurement deviates from a predetermined target value, wherein the vehicle continuously moves in a longitudinal direction relative to the system.

* * * * *